Figure 1:
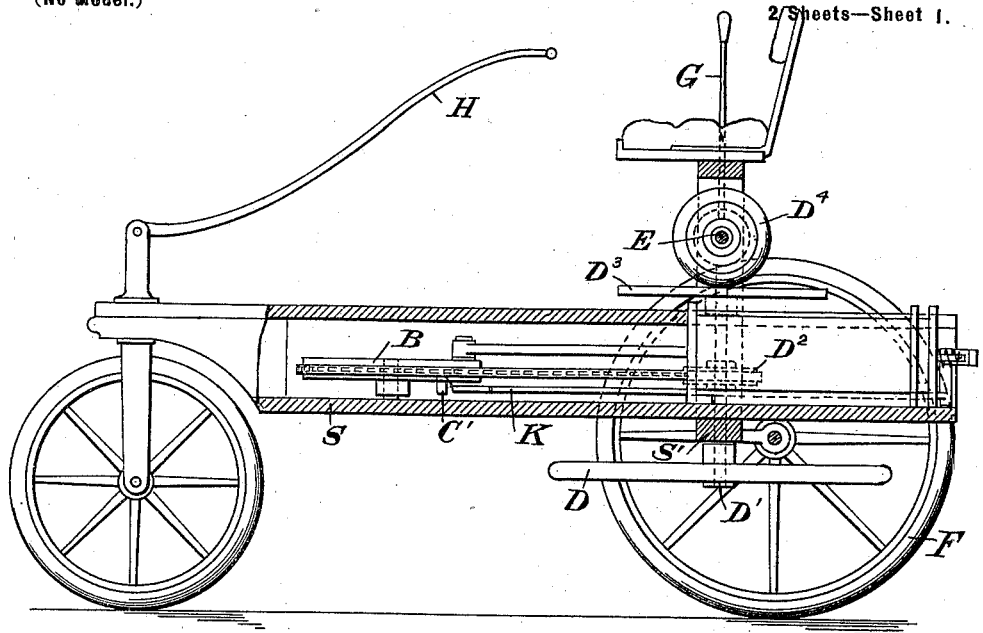

No. 653,264. Patented July 10, 1900.
R. P. SCOTT.
ROAD CART.
(Application filed July 1, 1896.)
(No Model.) 2 Sheets—Sheet 1.

Witnesses
Edgar Smith
James Smith

Inventor
Robert P. Scott

No. 653,264. Patented July 10, 1900.
R. P. SCOTT.
ROAD CART.
(Application filed July 1, 1896.)
(No Model.) 2 Sheets—Sheet 2.

Witnesses
Edgar Smith
James Smith

Inventor
Robert P. Scott

UNITED STATES PATENT OFFICE.

ROBERT P. SCOTT, OF CADIZ, OHIO.

ROAD-CART.

SPECIFICATION forming part of Letters Patent No. 653,264, dated July 10, 1900.

Application filed July 1, 1896. Serial No. 597,720½. (No model.)

*To all whom it may concern:*

Be it known that I, ROBERT P. SCOTT, a citizen of the United States, residing at Cadiz, Harrison county, Ohio, have invented a new and useful Improvement in Road-Cars, of which the following is a description.

My invention relates to road-cars driven by explosive-engines, and has for its object the production of a car whose weight shall be reduced below the limits hitherto attained and whose working parts shall attain the highest degree of simplicity. To these ends I employ a fly-wheel of very much less weight than those before produced and gain the requisite energy by separating the crank-shaft and the fly-wheel shaft and interposing gearing therebetween, so as to speed up the fly-wheel, and thus make up in speed what the fly-wheel has lost in weight. As the energy of a fly-wheel is proportioned to its weight multiplied by the square of its velocity, it will be seen that by doubling the speed I may reduce the weight to one-fourth and still have the same total of energy in the wheel. The fly-wheel in my construction is also mounted on the vehicle to rotate in a horizontal plane. This greatly increases the steadiness of the structure and its freedom from oscillation. A heavy mass rotating at a high velocity in a given plane has a pronounced tendency to remain in such plane and resists any effort to place it in a different plane. My geared-up fly-wheel rotating in a horizontal plane as applied to a road-car is therefore of itself an important feature of my invention, since it keeps the vehicle steady and tends to prevent oscillations in a vertical direction, but does not interfere with the movement of the vehicle in turning corners and the like. I also employ a sprocket-chain to convey motion from a sprocket on the crank-shaft to a sprocket on the fly-wheel shaft and place the fly-wheel shaft near the cylinder. The sprocket-chain thus comes nearly parallel to and in the same direction with the pitman-rod. In consequence the thrust of the pitman-rod on the crank-shaft in one direction is counteracted by the pull of the sprocket-chain upon the crank-shaft in the opposite direction and there is but little resultant pressure exerted upon the crank-shaft. The entire pressure comes on the part of the frame between the cylinder and the fly-wheel shaft, which, as above stated, are placed in proximity. I may therefore make the machine-frame comparatively light between the cylinder and crank-shaft and merely strengthen it between the cylinder and neighboring fly-wheel shaft. Thus the greatest part of the length of the machine-frame is light and but a small portion of the frame need be heavy. This results in a great saving of weight in the frame, which taken with the reduction in the weight of the fly-wheel enables me to construct a road-car weighing but a fraction as much as those now in use.

I attain simplicity of construction by means of the sprocket-chain before referred to, which I make of such length in comparison to the circumference of the sprocket-wheel on the crank-shaft that for a four-cycle engine a double revolution of the crank-shaft will cause a single complete revolution of the chain. I may then place one or more projections on the chain and arrange them to set off the igniting devices, the exhaust devices, and, if desired, the gas-inlet devices, which parts I term "cylinder-operating devices," at the proper intervals; or I may use one projection to set off or hold open the exhaust device and have the igniting devices and gas-inlet devices worked in other ways well known to the art.

Still another feature of my invention is the use of a friction-disk with a coöperating pneumatic friction-wheel for conveying power from the fly-wheel shaft, which not only simplifies the construction by dispensing with gear or sprocket connections, but also reduces the friction. In connection herewith I may use a hand friction-wheel bearing directly upon the pneumatic tires of the vehicle-wheels to transmit motion thereto, which also simplifies the construction, diminishes the number of parts, and largely reduces the friction.

Figure 2:
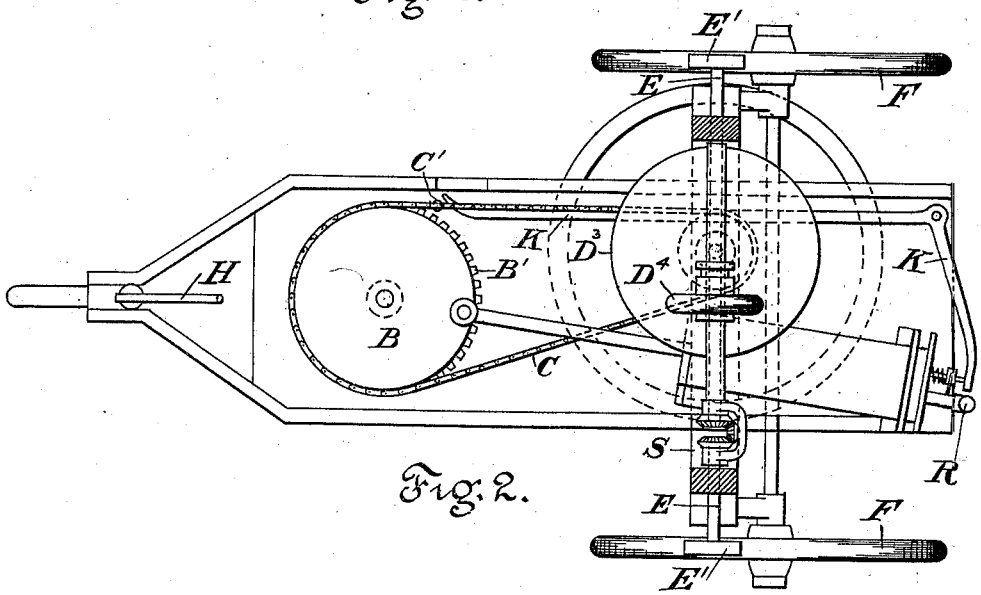
Figure 3:
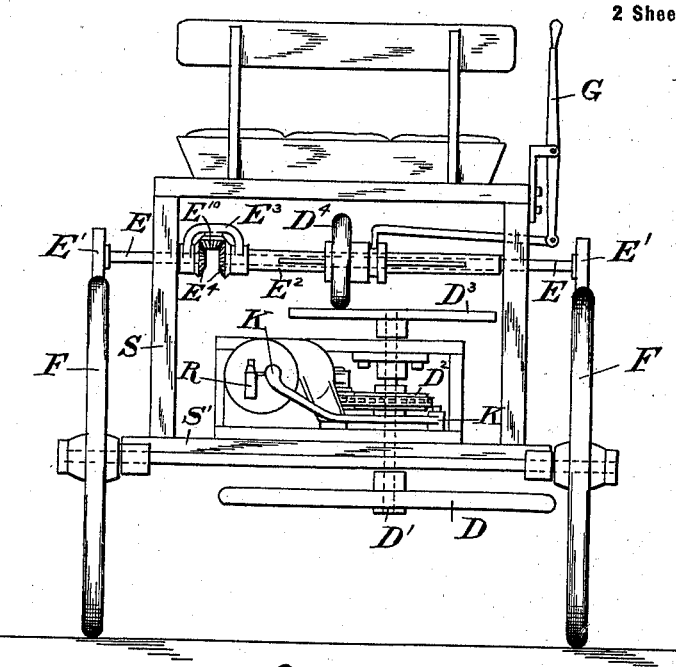

In the drawings, Figure 1 is an elevation of the car, a portion of the frame being shown in section. Fig. 2 is a plan of the car with the seat-posts in section. Fig. 3 is a rear elevation of the car, and Fig. 4 is a detail of the cylinder.

The cylinder A of the explosive-engine imparts motion to the crank-disk B through the pitman. On this crank-shaft, and preferably on the crank-disk, there is a sprocket B', driving a sprocket-chain C, which in turn communicates motion to the sprocket $D^2$, secured to the shaft D', on which is rigidly secured the fly-wheel D. It will be noticed that the sprocket $D^2$ is smaller than the sprocket B', so that the fly-wheel revolves at a higher angular rate of speed than the crank-shaft. It will also be noticed that the chain C is equal in length to twice the circumference of the sprocket B', so that two revolutions of the sprocket B' cause one complete revolution of the chain. The pin C' on the chain C will thus move the lever K, operating the exhaust-valve K' once for every double revolution of the crank-shaft, which corresponds to two excursions of the piston, as is requisite for a four-cycle engine.

Secured to the fly-wheel shaft D' is the friction-disk $D^3$, which revolves therewith. The pneumatic wheel $D^4$, which may be a small wheel carrying a pneumatic tire, receives motion from this friction-disk, and as the friction in the case of pneumatic tires is but small it will be seen that I save power as against the usual types of mechanism for conveying motion. This pneumatic wheel $D^4$ is splined to the tube $E^2$, which is secured to the yoke $E^3$, and thus rotates the gear $E^{10}$, pivoted to the yoke about the mathematical axis of the shaft. The rotation of this gear $E^{10}$, however, imparts rotation to the gears $E^4$ $E^4$, which are secured to the shafts E E and which carry the friction-wheels E', pressing against the pneumatic vehicle-wheels F. Motion is thus imparted from the fly-wheel shaft to the vehicle-wheels. The purpose of the balance-gear $E^{10}$ $E^4$ $E^4$ $E^3$ is to permit a faster motion of the vehicle-wheel F on one side of the vehicle than on the other, as will be necessary in turning a corner. The independence of the two shafts E E accomplishes this purpose. The pneumatic wheel $D^4$ being splined on the tube $E^2$ can be moved with reference to the center of the friction-disk $D^3$ by the lever G, so as to regulate the speed, as will be evident.

Figure 4:
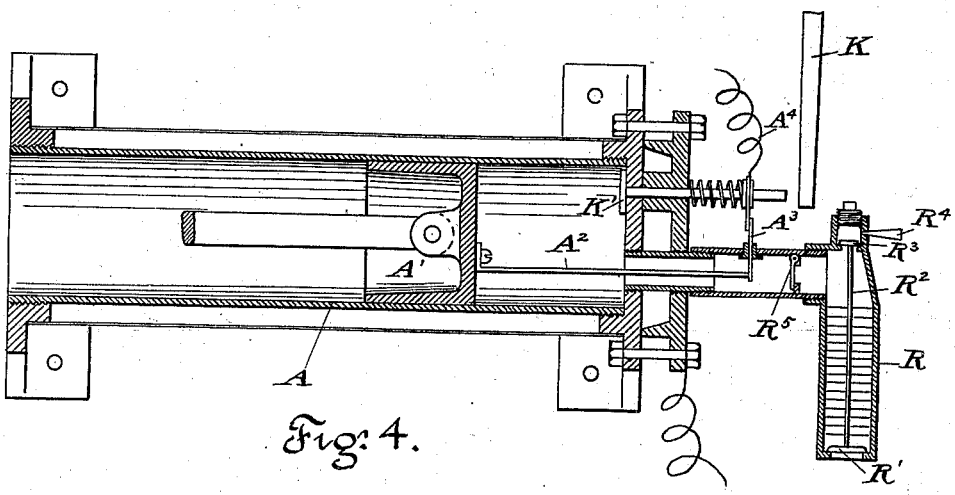

To describe in detail the cylinder-operating devices which I have shown in Fig. 4, I may begin with the igniting devices. These consist of an electrode $A^2$, carried on the piston A' and contacting with a stationary electrode $A^3$. In order that there may be a spark only at each second incursion of the cylinder, and thus prevent waste of battery, the electrode $A^3$ is connected to its circuit-wire $A^4$ only when the exhaust-valve K' is closed. When the exhaust-valve is open, as on the first return of the piston after ignition or when the governor holds it open, the electrode $A^3$ is held away from its circuit-wire $A^4$, and the contact of the electrodes $A^2$ $A^3$ can produce no spark, since the circuit is broken at another point. The gases having been ignited and the piston being on its first return stroke, it is necessary to hold open the exhaust-valve. This is done by properly placing the pin C' on the chain C, which operates the lever K, and thus presses in the valve K'. On the second—that is, the idle excursion of the piston $A^2$—it is necessary to draw into the cylinder the explosive gases. This is done by means of the valved carbureter R. The excursion of the piston opens the check-valve $R^5$ and the air-inlet valve R', which through the pin $R^2$, attached thereto, opens the gas or gasolene inlet valve $R^3$. The gasolene is constantly supplied through the inlet $R^4$. The mixed air and gasolene which is vaporized in the carbureter fills the carbureter, as well as the cylinder A, on the further excursion of the piston. On the second return stroke of the piston the check-valve $R^5$ is closed and the gases in the cylinder are compressed. They are ignited at the point of greatest compression by the igniting devices before described, and thus drive out the piston to give power to the crank-shaft and fly-wheel and through them to the vehicle-wheels.

It will be understood that I may use other types of exhaust-valves, igniting devices, and gas and air inlet devices or, broadly speaking, of cylinder-operating devices.

It will be noticed that the casing S not only acts as a frame for the parts, but also incloses them. Again, the heavy parts of the machine—the fly-wheel, cylinder, and friction-disks, as well as the seat for the rider—are all centered at one place near the rear axle of the vehicle. The car can thus be readily braced by the cross-bar S'. The fly-wheel, too, is placed at the lowest point, which reduces the liability of overturning the car and the liability of danger to the rider. The power-shafts being vertical, the wear on the shafts can readily be taken up by having cone-bearings, which are pressed to their seats by the weight of the shafts. The fact that these shafts are vertical also adds greatly to the compactness of the structure, since the disks and wheels are horizontal.

The machine is guided by the handle H.

What I claim is—

1. A road-car comprising the combination of a vehicle, an explosive-engine mounted thereon, a pitman, a crank-shaft, a horizontal fly-wheel on a separately-movable shaft and multiplying-gearing between the crank and fly-wheel shafts, whereby the total weight of the car is reduced and its steadiness increased substantially as described.

2. A road-car comprising the combination of a vehicle, an explosive-engine mounted thereon, its crank-shaft, a fly-wheel on a separately-movable shaft in proximity to the cylinder and a sprocket-chain connecting the crank and fly-wheel shafts, whereby the strain on the frame is confined in area substantially as described.

3. A four-cycle gas-engine comprising the combination of a crank-shaft carrying a sprocket-wheel, a sprocket-chain having a length double its circumference a coöperating sprocket-wheel and cylinder-operating device controlled by the chain substantially as described.

4. A four-cycle explosive-engine comprising the combination of a crank-shaft carrying a sprocket-wheel, a sprocket-chain having a length double its circumference a coöperating sprocket-wheel and an exhaust-operating device controlled by the chain substantially as described.

5. A road-car comprising the combination of a vehicle a four-cycle explosive-engine mounted thereon, its crank-shaft carrying a sprocket-wheel, a fly-wheel on a separate shaft carrying a smaller sprocket-wheel, a sprocket-chain connecting the sprocket-wheels of twice the length of the circumference of the crank-shaft sprocket and cylinder-operating devices controlled by the chain substantially as described.

6. A road-car comprising the combination of a vehicle, a four-cycle explosive-engine mounted thereon, its crank-shaft carrying a sprocket-wheel, a fly-wheel on a separate shaft in proximity to the cylinder and carrying a smaller sprocket-wheel, a sprocket-chain connecting the sprocket-wheels of twice the length of the circumference of the crank-shaft sprocket and cylinder-operating devices controlled by the chain substantially as described.

7. A road-car comprising the combination of a vehicle, a horizontal cylinder, a crank-shaft, a vertical fly-wheel shaft having a horizontal fly-wheel and a friction-disk mounted thereon, a vertical friction-wheel coöperating therewith and connections between the parts substantially as described.

8. A road-car comprising the combination of a vehicle, a horizontal cylinder thereon near the rear of the machine, a horizontal crank-disk near the front of the machine, a vertical shaft carrying a fly-wheel near the cylinder and connections between the parts substantially as described.

9. A road-car comprising a horizontal friction-disk a radially-movable friction-wheel, a balance-gear deriving motion from the friction-wheel and a second friction-wheel moved thereby coöperating with the pneumatic vehicle-wheel substantially as described.

ROBERT P. SCOTT.

Witnesses:
ARTHUR W. ROBSON,
WM. J. ROTH.